United States Patent
Palanivelu et al.

(10) Patent No.: US 8,953,720 B1
(45) Date of Patent: Feb. 10, 2015

(54) PACKET TYPE AUTO-DETECTION IN A WIRELESS LOCAL AREA NETWORK (WLAN)

(71) Applicant: Marvell International Ltd., Hamilton (BM)

(72) Inventors: Arul Durai Murugan Palanivelu, Sunnyvale, CA (US); Sudhir Srinivasa, Sunnyvale, CA (US); Hongyuan Zhang, Fremont, CA (US); Rohit U. Nabar, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 118 days.

(21) Appl. No.: 13/747,059

(22) Filed: Jan. 22, 2013

Related U.S. Application Data (60) Provisional application No. 61/588,859, filed on Jan. 20, 2012.

(51) Int. Cl.
*H04L 27/06* (2006.01)
*H04L 27/26* (2006.01)

(52) U.S. Cl.
CPC .................................. *H04L 27/2649* (2013.01)
USPC ......................................................... 375/340

(58) Field of Classification Search
USPC .................. 375/279, 316, 329, 340, 346, 348
See application file for complete search history.

(56) References Cited

U.S. PATENT DOCUMENTS

| | | | |
|---|---|---|---|
| 8,081,691 B2 * | 12/2011 | Joseph et al. | 375/260 |
| 8,144,647 B2 | 3/2012 | Nabar et al. | |
| 8,675,755 B1 | 3/2014 | Lee et al. | |
| 2005/0174927 A1 | 8/2005 | Stephens et al. | |
| 2008/0181323 A1 * | 7/2008 | Waters et al. | 375/260 |
| 2009/0196163 A1 | 8/2009 | Du | |

(Continued)

FOREIGN PATENT DOCUMENTS

WO    WO-2012/122119 A1    9/2012

OTHER PUBLICATIONS

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

(Continued)

*Primary Examiner* — Khanh C Tran (57) ABSTRACT

In a method for detecting a packet type of an orthogonal frequency division multiplexing (OFDM) data unit detected in a communication channel, a first estimate and a second estimate of a transmitted symbol are determined for each of at least some of a plurality of OFDM tones in an OFDM symbol of the data unit. A first distance and a second distance are determined between a received symbol and, respectively, the first estimate and the second estimate scaled by a channel response estimate corresponding to the OFDM tone. A first total distance is determined based on a mathematical summation of the first distances over the plurality of OFDM tones. A second total distance is determined based on a mathematical summation of the second distances over the plurality of OFDM tones. The packet type is determined based at least on the first total distance and the second total distance.

20 Claims, 5 Drawing Sheets

(56) References Cited

U.S. PATENT DOCUMENTS

| | | | |
|---|---|---|---|
| 2012/0195391 | A1 | 8/2012 | Zhang et al. |
| 2012/0201316 | A1 | 8/2012 | Zhang et al. |
| 2012/0294294 | A1 | 11/2012 | Zhang |
| 2012/0300874 | A1 | 11/2012 | Zhang |

OTHER PUBLICATIONS

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

Park, "Proposed Specification Framework for TGah", *The Institute of Electrical and Electronics Engineers*, doc. No. IEEE 802.11-11/1137r6, (Mar. 2012).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, Nov. 2011.

Yu, et al. "Coverage extension for IEEE802.11ah," *The Institute of Electrical and Electronics Engineers*, doc. No. IEEE 802.11-11/0035r1, (Jan. 2011).

Vermani, et al. "Preamble Format for 1 MHz," *The Institute of Electrical and Electronics Engineers*, doc. No. IEEE 802.11-11/1482r2, (Nov. 2011).

U.S. Appl. No. 13/706,163, filed Dec. 5, 2012.

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

Lee et al., "TGaf PHY proposal," *The Institute of Electrical and Electronics Engineers*, doc. No. IEEE 802.11-12/0809r5, pp. 1-43, Jul. 10, 2012.

Yu et al., "Coverage extension for IEEE802.11ah," *The Institute of Electrical and Electronics Engineers*, doc. No. IEEE 802.11-11/0035r1, pp. 1-10 (Jan. 2011).

Taghavi et al., "Introductory Submission for TGah", doc. No. IEEE 802.11-11/0062r0, *Institute for Electrical and Electronics Engineers*, pp. 1-5 (Jan. 14, 2011).

de Vegt, "Potential Compromise for 802.11ah Use Case Document", Institute of Electrical and Electronics Engineers, doc. No. IEEE 802.11-11/0457r0, pp. 1-27 (Mar. 2011).

Zhang et al., "11ah Data Transmission Flow," *The Institute of Electrical and Electronics Engineers*, doc. No. IEEE 802.11-11/1484r1, pp. 1-15 (Nov. 2011).

Park, "Proposed Specification Framework for TGah", *The Institute of Electrical and Electronics Engineers*, doc. No. IEEE 802.11-11/1137r6, pp. 1-13 (Mar. 2012).

Park, "Proposed Specification Framework for TGah D9.x", *The Institute of Electrical and Electronics Engineers*, doc. No. IEEE 802.11-yy/xxxxr0, pp. 1-30 (Jul. 2012).

Vermani, et al. "Preamble Format for 1 MHz," *The Institute of Electrical and Electronics Engineers*, doc. No. IEEE 802.11-11/1482r2, pp. 1-30 (Nov. 2011).

Zhang et al., "1MHz Waveform in Wider BW ", *The Institute of Electrical and Electronics Engineers*, doc. No. IEEE 802.11-12/0309r1, pp. 1-10 (Mar. 2012).

Vermani, et al. "Spec Framework Text for PHY Numerology," *The Institute of Electrical and Electronics Engineers*, doc. No. IEEE 802.11-11/1311r-0, pp. 1-5 (Sep. 2011).

Park, "Proposed Specification Framework for TGah", *The Institute of Electrical and Electronics Engineers*, doc. No. IEEE 802.11-11/1137r11, pp. 1-36 (Sep. 2012).

Park, "Specification Framework for TGah," *The Institute of Electrical and Electronics Engineers*, doc. No. IEEE 802.11-11/1137r13, pp. 1-58 (Jan. 14, 2013).

Zhang et al., "Beamforming Feedback for Single Stream," *The Institute of Electrical and Electronics Engineers*, doc. No. IEEE 802.11-12/1312r0, pp. 1-22 (Nov. 12, 2012).

Shao, "Channel Selection for 802.11ah," doc.: IEEE 802.11-12/0816r0, pp. 1-11 (Jul. 2012).

\* cited by examiner

FIG. 4A BPSK

FIG. 4B Q-BPSK

FIG. 5

PACKET TYPE AUTO-DETECTION IN A WIRELESS LOCAL AREA NETWORK (WLAN)

CROSS-REFERENCES TO RELATED APPLICATIONS

This disclosure claims the benefit of U.S. Provisional Patent Application No. 61/588,859, filed on Jan. 20, 2012, the disclosure of which is incorporated herein by reference.

FIELD OF THE DISCLOSURE

The present disclosure relates generally to communication networks and, more particularly, to long range low power wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on a two new standards, IEEE 802.11ah and IEEE 802.11af, each of which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.1 ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In an embodiment, a method for detecting a packet type of an orthogonal frequency division multiplexing (OFDM) data unit received via a communication channel includes, for each of at least some of a plurality of OFDM tones in an OFDM symbol of the data unit, determining a first estimate of a transmitted symbol corresponding to the OFDM tone, determining a first distance, the first distance being between a received symbol and the first estimate scaled by a channel response estimate corresponding to the OFDM tone. The method also includes, for each of the least some of a plurality of OFDM tones in the OFDM symbol of the data unit, determining a second estimate of the transmitted symbol corresponding to the OFDM tone, the second estimate being different than the first estimate, and determining a second distance, the second distance being between the received symbol and the second estimate scaled by the channel response estimate corresponding to the OFDM tone. The method further includes determining a first total distance based on a mathematical summation of the first distances over the plurality of OFDM tones, and determining a second total distance based on a mathematical summation of the second distances over the plurality of OFDM tones. The method additionally includes determining the packet type of the OFDM data unit based at least on (i) the first total distance and (ii) the second total distance.

In another embodiment, an apparatus for detecting a packet type of an orthogonal frequency division multiplexing (OFDM) data unit received via a communication channel, the apparatus comprising a packet type detector configured to, for each of at least some of a plurality of OFDM tones in an OFDM symbol of the data unit, determine a first estimate of a transmitted symbol corresponding to the OFDM tone, and determine a first distance, the first distance being between a received symbol and the first estimate scaled by a channel response estimate corresponding to the OFDM tone. The packet type detector is also configured to, for each of at least some of the plurality of OFDM tones in the OFDM symbol of the data unit, determine a second estimate of the transmitted symbol corresponding to the OFDM tone, the second estimate being different than the first estimate, and determine a second distance, the second distance being between the received symbol and the second estimate scaled by the channel response estimate corresponding to the OFDM tone. The packet type detector is further configured to determine a first total distance based on a mathematical summation of the first distances over the plurality of OFDM tones, and determine a second total distance based on a mathematical summation of the second distances over the plurality of OFDM tones. The packet type detector is additionally configured to determine the packet type of the OFDM data unit based at least on (i) the first total distance and (ii) the second total distance.

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol defines operation in a sub-1 GHz frequency range, and is typically used for applications requiring long range wireless communication with relatively low data rates. The first communication protocol (e.g., IEEE 802.11af or IEEE 802.11ah) is referred to herein as a "long range" communication protocol. In some embodiments, the AP is also configured to communicate with client stations according to one or more other communication protocols which define operation in generally higher frequency ranges and are typically used for closer-range communications with higher data rates. The higher frequency communication protocols (e.g., IEEE 802.11a, IEEE 802.11n, IEEE 802.11ac, and/or IEEE 802.11ad) are collectively referred to herein as "short range" communication protocols. In some embodiments, different client stations in the vicinity of the AP are configured to operate according to different short range communication protocols. For example, some client stations in the vicinity of the AP are configured to operate according to one or more legacy short range communication protocols (e.g., IEEE 802.11a, IEEE 802.11n), while other client stations in the vicinity of the AP are configured to operate according to a newer or non-legacy short range communication protocol (e.g., IEEE 802.11ac, IEEE 802.11ad). In such embodiments, the AP is configured to transmit data units that that conform to legacy short range communication protocols ("legacy data units") to legacy client stations, and data unit that conform to non-legacy short range communication protocols ("non-legacy data units") to non-legacy client stations. When transmitting data units, the AP modulates at least a portion of a non-legacy data unit (e.g., one or more OFDM symbols in a preamble of the data unit) differently than a corresponding portion of a legacy data unit to permit a client station receiving a data unit to determine, or to auto-detect, the particular type ("packet type) of the data unit (i.e., whether the data unit is a legacy data unit or a non-legacy data unit), in some embodiments.

In some embodiments, physical layer (PHY) data units conforming to the long range communication protocol ("long range data units") are the same as or similar to data units conforming to a short range communication protocol ("short range data units"), but are generated using a lower clock rate. To this end, in an embodiment, the AP operates at a clock rate suitable for short range operation, and down-clocking is used to generate a clock to be used for the sub-1 GHz operation. As a result, in this embodiment, a long range data unit maintains the physical layer format of a short range data unit, but is transmitted over a longer period of time.

In addition to this "normal mode" specified by the long range communication protocol, in some embodiments, the long range communication protocol also specifies a "low bandwidth mode" with a reduced bandwidth and data rate compared to the lowest bandwidth and data rate specified for the normal mode. Because of the lower data rate, the low bandwidth mode further extends communication range and generally improves receiver sensitivity. Data units corresponding to the low bandwidth mode are generated utilizing the same clock rate as data units corresponding to the normal mode (e.g., are down-clocked by the same ratio used for normal mode data units), in some embodiments. For example, orthogonal frequency division multiplexing (OFDM) symbols of normal mode data units and low bandwidth mode data units both have the same subcarrier/tone spacing and OFDM symbol duration, in an embodiment. When transmitting data units, the AP modulates at least a portion of a low bandwidth data unit (e.g., one or more OFDM symbols in a preamble of the data unit) differently than a corresponding portion of a normal mode data unit to permit a client station receiving a data unit to determine, or to auto-detect, that packet type of the data unit (i.e., whether the data unit is a normal mode data unit or a low bandwidth data unit), in some embodiments.

Figure 1:
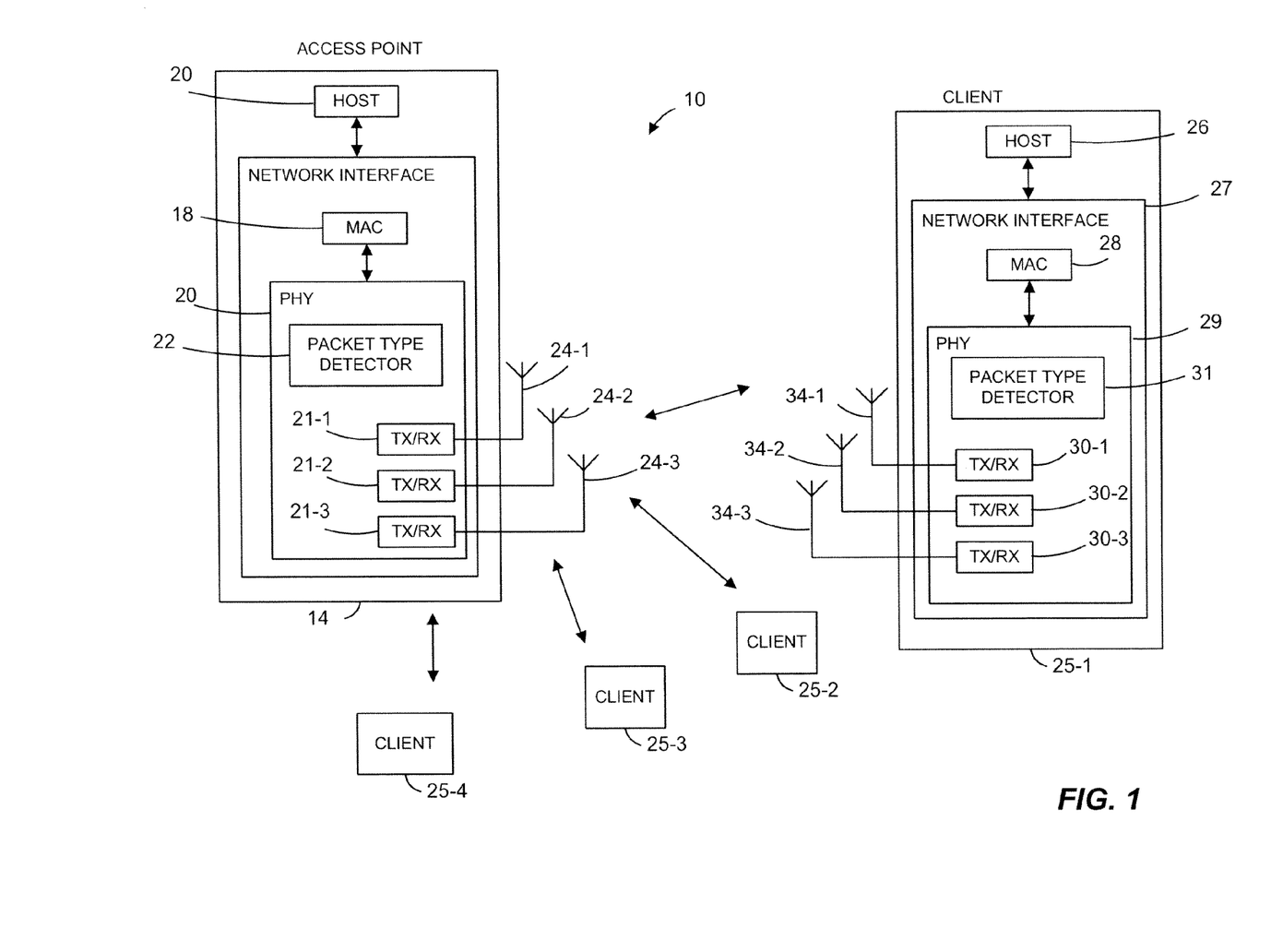
FIG. 1 is a block diagram of an example wireless local area network (WLAN), according to an embodiment.

FIG. 1 is a block diagram of an example WLAN 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In an embodiment, the AP 14 also includes a packet type detector 19 configured to accurately detect packet type (e.g., normal mode data unit, low bandwidth mode data unit, legacy data unit, etc.) of incoming data units in accordance with various embodiments of the present disclosure.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the long range communication protocol. In some embodiments, at least one of the client stations 25 (e.g., client station 25-4) is a legacy or a non-legacy short range client station that is configured to operate at least according to one or more of the short range communication protocols.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments. In an embodiment, the client station 25-1 also includes a packet type detector 31 configured to accurately detect packet type (e.g., normal mode data unit, low bandwidth mode data unit, legacy data unit, etc.) of incoming data units in accordance with various embodiments of the present disclosure.

In some embodiments, one, some, or all of the client stations 25-2, 25-3, and 25-4 has/have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the PHY processing unit 20 of the AP 14 is configured to generate data units conforming to the long range communication protocol and having formats described hereinafter. The transceiver(s) 21 is/are configured to transmit the generated data units via the antenna(s) 24. Similarly, the transceiver(s) 21 is/are configured to receive data units via the antenna(s) 24. The PHY processing unit 20 of the AP 14 is also configured to process received data units conforming to the long range communication protocol and having formats described hereinafter, according to various embodiments.

In various embodiments, the PHY processing unit 29 of the client device 25-1 is configured to generate data units conforming to the long range communication protocol and having formats described hereinafter. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is also configured to process received data units conforming to the long range communication protocol and having formats described hereinafter, according to various embodiments.

In some embodiments, the AP 14 is configured to operate in dual band configurations. In such embodiments, the AP 14 is able to switch between a short range mode of operation and a long range mode of operation. According to one such embodiment, when operating in short range mode, the AP 14 transmits and receives data units that conform to one or more of the short range communication protocols. When operating in a long range mode, the AP 14 transmits and receives data units that conform to the long range communication protocol. In some such embodiments, the AP 14 transmits normal mode data units when operating in normal mode, and low bandwidth data units when operating in low bandwidth mode.

Similarly, the client station 25-1 is capable of dual frequency band operation, according to some embodiments. In these embodiments, the client station 25-1 is able to switch between a short range mode of operation and a long range mode of operation. In other embodiments, the AP 14 and/or the client station 25-1 is dual band device that is able to switch between different low frequency bands defined for long range operations by the long range communication protocol. In yet another embodiment, the AP 14 and/or the client station 25-1 is a single band device configured to operate in only one long range frequency band.

In various embodiments, when transmitting a data unit, the AP modulates one or more OFDM symbols of the data unit so as to allow a device receiving the data unit to determine or auto-detect a packet type of the data unit prior to actually decoding the data unit. For example, using techniques described herein, a receiving device is able to accurately determine whether the data unit is a normal mode data unit or a low bandwidth mode data unit, and to then properly decode the data unit according to the particular physical layer format of the data unit corresponding to the determined packet type of the data unit, in some embodiments and/or scenarios. In other example embodiments and/or scenarios, using techniques described herein, a receiving device is able to determine whether the data unit is a "legacy" short range data unit that conforms, for example, to an older one of the long range communication protocol, or a "non-legacy" short range data unit that conforms, for example, to a newer long range communication protocol. For simplicity and ease of explanation, various packet type detection techniques are described below in connection to detecting whether a data unit is a normal mode data unit or a low bandwidth mode data unit. Alternatively or additionally, such packet detection techniques are utilized to distinguish between legacy and non-legacy short range data units, in some embodiments.

Figure 2A:
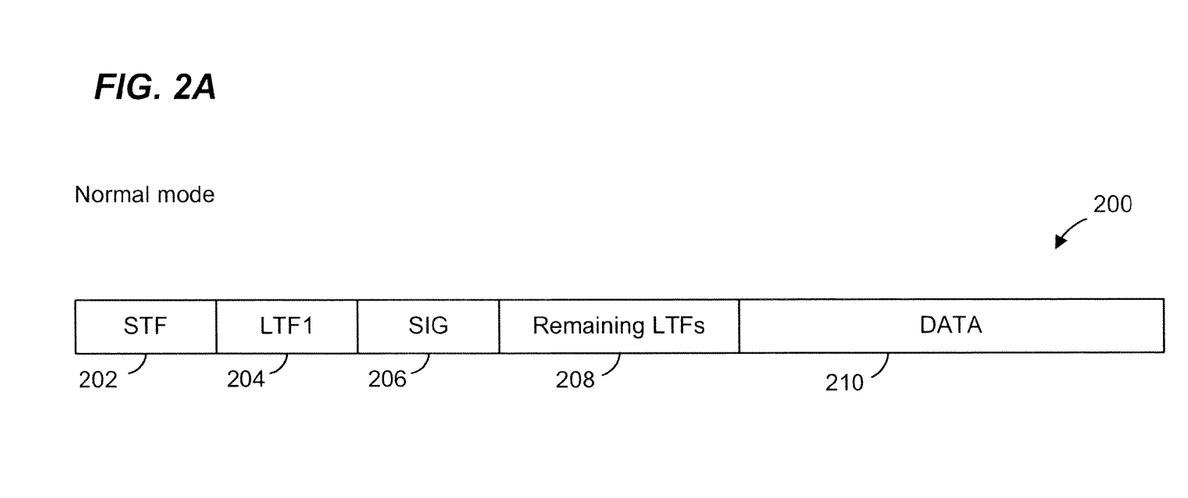
FIGS. 2A and 2B are diagrams of an example normal mode data unit and an example low bandwidth mode data unit, according to an embodiment.

FIG. 2A is a diagram of an example normal mode long range data unit 200 that the AP 14 is configured to transmit to the client station 25-4 via orthogonal frequency domain multiplexing (OFDM) modulation, according to an embodiment. In an embodiment, the client station 25-4 is also configured to transmit the data unit 200 to the AP 14, according to an embodiment. The normal mode data unit 200 is a down-clocked version of data units conforming to a short range communication protocol. For the particular embodiment shown in FIG. 2, the normal mode data units 200 is a down-clocked version of an IEEE 802.11n data unit using the "Greenfield" (rather than mixed mode) preamble. In other embodiments, the normal mode data unit 200 is a down-clocked version of a data unit conforming to another short range communication protocol.

The normal mode data unit 200 corresponds to a lowest normal mode channel bandwidth (e.g., 2 MHz utilizing a 64-point IDFT), and includes a short training field (STF) 202, a first long training field (LTF1) 204, a signal (SIG) field 206, remaining LTFs 208 (e.g., one additional LTF per spatial stream), and a data portion 210. Generally, the STF 202 is used for packet detection, initial synchronization, and automatic gain control, etc., the LTFs 204 are used for channel estimation and fine synchronization, and the SIG field 206 is used to carry certain physical layer (PHY) parameters of the data unit 200, such as signal bandwidth (e.g., 2 MHz for data unit 200), modulation type, and coding rate used to transmit the data unit, for example.

For higher bandwidth normal mode data units, the STF, LTFs, and SIG field are duplicated in each of multiple sub-bands, each sub-band having a bandwidth equal to the lowest normal mode channel bandwidth, in some embodiments. For example, in an embodiment, a higher bandwidth (e.g., 4 MHz, 8 MHz, 16 MHz, etc.) data unit duplicates the STF 202, LTFs 204, 208, and the SIG field 206 in each 2 MHz band as a preamble to the data portion 210 of the data unit, and the data portion 210 occupies the full (e.g., 4 MHz, 8 MHz, 16 MHz, etc.) bandwidth without frequency duplication. A receiver detecting normal mode data unit 200 is able to determine the bandwidth of the data unit based on bandwidth information in SIG field 206, in an embodiment.

Figure 2B:
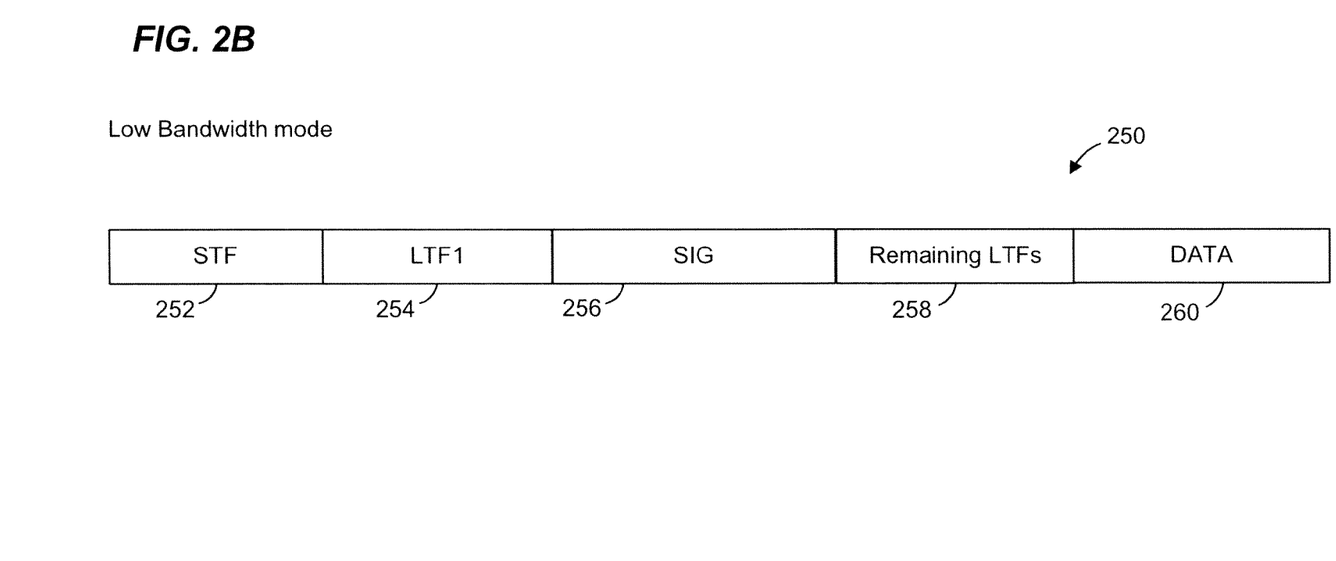
Figure 3A:
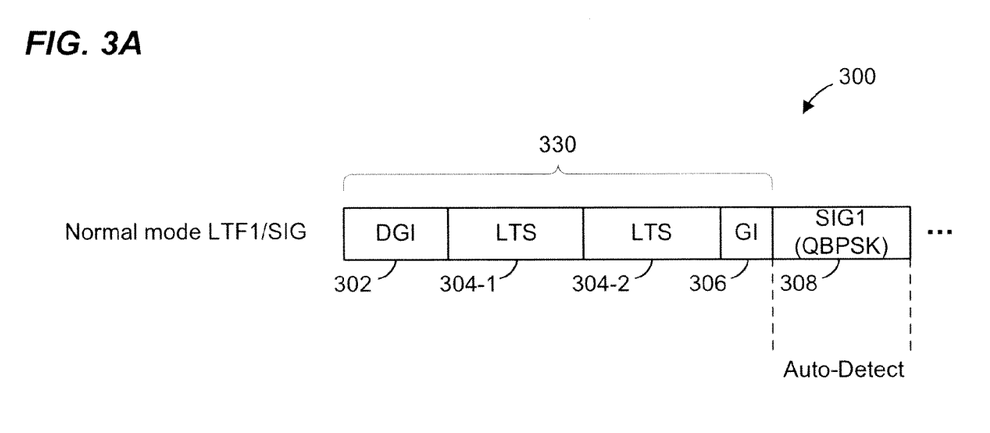
FIGS. 3A and 3B are diagrams illustrating a preamble portion of a normal mode data unit and a preamble portion of a low bandwidth mode data unit, respectively, according to an embodiment.
Figure 3B:
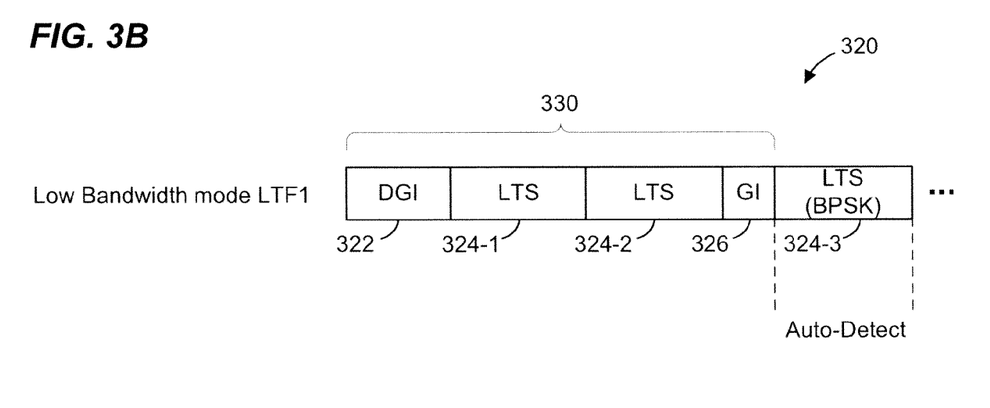

FIG. 3B is a diagram of an example low bandwidth mode data unit 250, according to an embodiment. The low bandwidth mode data unit 250 is generated using the same clock rate as the normal mode data unit 200, but utilizing a smaller size IDFT to reduce the bandwidth. For example, in one embodiment in which the normal mode data units 200 corresponds to a 2 MHz or a 4 MHz bandwidth generated using a 64-point IDFT and a 128-point IDFT, respectively, the low bandwidth mode data unit 250 has a 1 MHz bandwidth, and is generated using a 32-point IDFT. Similar to the normal mode data unit 200, the low bandwidth mode data unit 250 includes an STF 252, an LTF1 254, a SIG field 256, and remaining LTFs 258 (e.g., one additional LTF per spatial stream, if more than one spatial stream is utilized for low bandwidth mode data units). The STF 252, LTFs 254, 258 and SIG 256 make up the preamble portion of the data unit 250. In some embodiments, various fields within the preamble of low bandwidth mode data unit 350 differ in various ways from the corresponding fields in the normal mode data unit 200. Generally, any of the low rate PHY preambles described in U.S. application Ser. No. 13/366,064 are utilized for low bandwidth mode data units, in various embodiments, but with a reduced bandwidth as compared to normal mode data units. In some embodiments, the low bandwidth mode data unit 250 also includes the data portion 260 having the same bandwidth as the preamble of the data unit 250.

In some embodiments, one or more OFDM symbols of the preamble portion of the normal mode data unit 200 are modulated differently compared to the modulation of the corresponding OFDM symbols of the preamble portion of the low bandwidth mode data unit 250. For example, all OFDM symbols of the preamble of the normal mode data unit 200 are modulated according to binary phase shift keying (BPSK), whereas at least one OFDM symbol of the preamble of the low bandwidth mode data unit 250 (e.g., at least one OFDM symbol of the signal field 256) is modulated according to quadrature binary phase shift keying (Q-BPSK). In other words, to signify that the data unit is a low bandwidth mode data unit, at least one OFDM symbol of the preamble of the low bandwidth mode data unit 250 is rotated 90 degrees as compared to OFDM symbols of the normal mode data unit 300, in an embodiment. In this case, a device receiving a data unit is able to auto-detect that the data unit is the low bandwidth mode data unit 350, and not the normal mode data unit 300, by detecting an OFDM symbol (e.g., an OFDM symbol of a signal field of a data unit) having energy substantially along the quadrature axis, in an embodiments.

As an example, FIGS. 3A-3B are diagrams illustrating a preamble portion 300 and a preamble portion 320 included in a normal mode data unit and a low bandwidth mode data unit, respectively, according to an embodiment. In an embodiment, the preamble portion 300 corresponds to the LTF1 field 204 and the first OFDM symbol of the SIG field 206 in FIG. 2A, and the preamble portion 320 corresponds to the first three OFDM symbols of the LTF1 field 254 in FIG. 2B. The preamble portion 300 includes a double guard interval (DGI) 302, two long training symbols (LTS) 304 in a first long training field (LTF1), a guard interval (GI) 306, and a first OFDM symbol of a signal field (SIG1) 308. The first OFDM symbol field 308 begins a time interval 330 after the beginning of LTF1 (i.e., the beginning of DGI 302 within LTF1). The preamble portion 320 similarly includes DGI 322, two LTS 324 in LTF1, and a guard interval (GI) 326. The LTF1 of the preamble portion 320, however, includes a greater number of long training symbols than the preamble portion 300 of the normal mode data unit. For example, LTF1 of the second preamble portion 320 includes four long training symbols, in an embodiment. In one embodiment, each long training symbol after LTS 324-2 is preceded by a guard interval. For example, as seen in the example embodiment of FIG. 3B, the guard interval 26 separates the third and fourth LTSs 324-2 and 324-3, respectively. By including guard interval 426, the location of the third LTS 424-3 relative to the beginning of LTF1 of preamble portion 420 is the same as the location of the SIG1 field 408 relative to the beginning of LTF1 of preamble portion 400 (i.e., each begins a time interval 430 after the beginning of the corresponding LTF1). In some embodiments, to allow a receiving device to determining that a data unit is a normal mode data unit and not a low bandwidth mode data unit, the SIG1 408 is modulated with a different modulation technique than the third LTS 454-3, in an embodiment. For example, the SIG1 field 408 is quaternary binary phase shift key (QBPSK) modulated and the third LTS 424-3 is binary phase shift key (BPSK) modulated, or vice versa, in various embodiments.

Figure 4A:
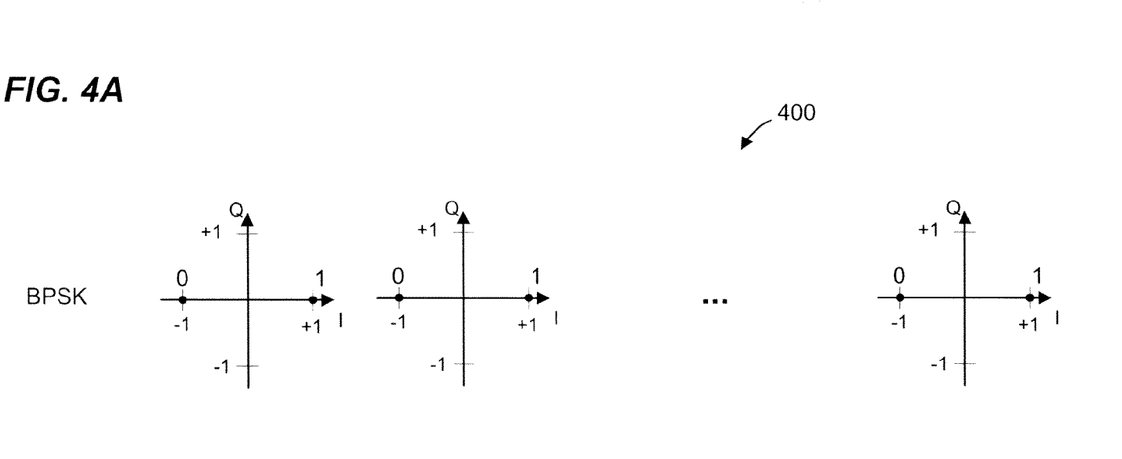
FIGS. 4A and 4B are diagrams illustrating example modulation techniques used to modulate symbols within fields of a preamble, according to an embodiment.
Figure 4B:
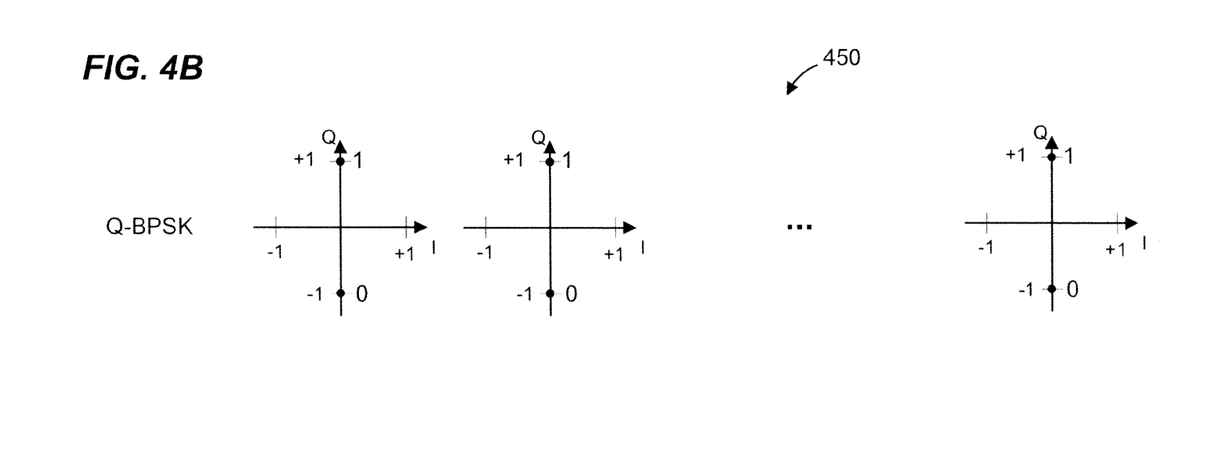

FIGS. 4A-4B are illustrations of modulation symbols used for modulating OFDM symbols, in some embodiments. In particular, FIG. 4A illustrates possible constellation points for each of a plurality of OFDM tones in an OFDM symbol 400 modulated according to BPSK modulation. FIG. 4B illustrates possible constellation points for each of a plurality of OFDM tones in an OFDM symbol 450 modulated according to Q-BPSK modulation. As seen in FIGS. 4A-4B, the set of constellation points for each Q-BPSK modulated OFDM tone in the OFDM symbol 450 is rotated by 90 degrees with respect to the set of constellation points for each BPSK modulated tone in the OFDM symbol 400. In an embodiment, each OFDM symbol in a preamble of a normal mode data unit (e.g., the data unit 200 of FIG. 2A) is modulated according to BPSK modulation as the OFDM symbol 400, while at least one OFDM symbol of a low bandwidth mode data unit (e.g., the data unit 250 of FIG. 2B) is modulated according to Q-BPSK modulation as the OFDM symbol 450, or vise versa. For example, referring to FIGS. 2A and 2B, in one embodiment, at least one OFDM symbol of the signal field 206 of the normal mode data unit 200 is modulated according to Q-BPSK modulation as illustrated in FIG. 4B, while all OFDM symbols of the low mode data unit 250 are modulated according to BPSK modulation as illustrated in FIG. 4B. Referring now to FIGS. 3A-3B, the OFDM symbol 400 corresponds to LTS 324-3 of FIG. 3B, and the OFDM symbol 450 corresponds to the SIG1 308 of FIG. 3A, in an embodiment. Thus, a receiving device is able to determine the particular type (or mode) of a data unit by detecting modulation type of a particular symbol OFDM symbol of the preamble of the data unit (e.g., of the third OFDM symbol in the preamble of the data unit), or by simply detecting a presence of a Q-BPSK modulated OFDM symbol in the preamble of the data unit.

In order to determine the modulation of an OFDM symbol in a received data unit, a device receiving the data unit detects whether signal energy in the received OFDM symbol lies primarily on the real axis or on the imaginary axis, in an embodiment. For clarity, a prior art technique for detecting the modulation of an OFDM symbol is first described. In the prior art technique, a receiving device determines whether a data unit being received by the device corresponds to a first packet type or to a second packet type based on the modulation type of an OFDM symbol in a preamble of the data unit. To detect the modulation type of an OFDM symbol in the data unit, the receiving device first determines an equalized received signal for each OFDM tone in the OFDM symbol an according to:

$$z_k = \frac{y_k}{h_k} \quad \text{Equation 1}$$

where $y_k$ is the received signal on the $k_{th}$ OFDM tone, and $h_k$ is an estimate of the communication channel response of the communication channel between the device that transmitted the data unit and the receiving device receiving the data unit, as seen on the $k_{th}$ OFDM tone. Then, for each OFDM tone, the receiver determines whether the magnitude of the real part of the equalized received symbol $z_k$ or $|real(z_k)|$, is greater than the magnitude of the imaginary part of the equalized symbol $z_k$, or $|imag(z_k)|$. Thus, a hard decision in regard to the identity of the transmitted symbol is made for each OFDM tone in an OFDM symbol in a data unit, and these hard decisions are then used to determine the modulation of the OFDM symbol, and to thereby determine, or auto-detect, the packet type of the data unit, according to the prior art technique. More particularly, in the case that the number of OFDM tones in the OFDM symbol for which the real part of the equalized symbol $z_k$ is greater than the imaginary part of the equalized symbol $z_k$ exceeds the number of OFDM tones in the OFDM symbol for which the imaginary part of the equalized symbol $z_k$ is greater than the real part of the equalized symbol $z_k$ the receiver determines that the data unit corresponds to the first packet type. On the other hand, in the case that the number of OFDM tones in an OFDM symbol for which the imaginary part of the equalized symbol $z_k$ is greater than the real part of the equalized symbol $z_k$ exceeds the number of OFDM tones in the OFDM symbol for which the real part of the equalized symbol $z_k$ is greater than the imaginary part of the equalized symbol $z_k$, then the receiver determines that the data unit being received corresponds to the second packet type.

To improve accuracy of packet type detection and to thereby reduce packet error rate due to incorrectly determined packet type, in various embodiments, packet type decision is made based on a summation of distances between the received signal and an estimated transmitted signal over a plurality of OFDM tones, as will be explained in more detail below. In some embodiments and/or scenarios, the packet detection technique described herein is performed by the packet type detector 31 of the client station 25-1 to detect packet type of data units that the client station 25-1 receives from the AP14. In other embodiments and/or scenarios the packet detection technique described herein is performed by the packet type detector 22 of the AP14 to detect packet type of data units that the client station AP14 receives from a client station 25 (e.g., the client station 25-1). For simplicity, the packet type detection technique is described below as being performed by the packet type detector 31 of the client station 25-1.

A transmitting device (e.g., the AP14) transmits a data unit to a receiving device (e.g., the client station 25-1). The receiving device, when receiving the data unit, determines whether the data unit corresponds to a first packet type (e.g., a low bandwidth data unit) or to a second packet type (e.g., a normal mode data unit) based on the modulation type of an OFDM symbol in a preamble of the data unit, in an embodiment. For example, a packet type detector in the receiving device (e.g., the packet type detector 31) determines or detects whether an OFDM symbol of a signal field of the data unit is modulated according to BPSK modulation (as the OFDM symbol 400 of FIG. 4A) or Q-BPSK modulation (as the OFDM symbol 450 of FIG. 4B), in one embodiment. In this embodiment, the packet type detector 31 then determines the packet type of the data unit based on the detected modulation type of the OFDM symbol of the data unit. For example, the packet type detector 31 determines that the data unit corresponds to the first packet type when BPSK modulation is detected, and corresponds to the second packet type when Q-BPSK modulation is detected, in an embodiment. In order to determine the modulation of the OFDM symbol, in an embodiment, the packet type detector 31, for each of at least some OFDM tones of the received OFDM symbol, first determines an estimate of a real part of the transmitted symbol according to:

$$x_{re} = \text{sign}\left(\text{real } \frac{y_k}{h_k}\right) \quad \text{Equation 3}$$

and determines an estimate of an imaginary part of the transmitted symbol according to:

$$x_{im} = \text{sign}\left(\text{imag } \frac{y_k}{h_k}\right) \quad \text{Equation 4}$$

where k is OFDM tone index, $y_k$ is the received constellation point, and $h_k$ is the channel response of the communication channel between the transmitting device and the receiving device as seen by the $k_{th}$ OFDM tone.

Upon determining the estimate of the real part $x_{re}$ of the transmitted symbol and the estimate the imaginary part $x_{im}$ of the transmitted symbol for each OFDM tone, the packet type detector 31 computes, for each OFDM tone, the distance, in each dimension, between the received symbol and the estimated transmitted symbol according to:

$$d_{re}(k) = |y_k - h_k * x_{re}|^2 \quad \text{Equation 5}$$

$$d_{im}(k) = |y_k - h_k * (jx_{im})|^2 \quad \text{Equation 6}$$

Then, the packet type detector 31 determines a total real distance for the OFDM symbol by performing a mathematical summation of the real distances $d_{re}(k)$ over all OFDM tones k, and determines a total imaginary distance for the OFDM symbol by performing a mathematical summation of the imaginary distances $d_{im}(k)$ over all OFDM tones k according to:

$$D_{re} = \text{sum}(d_{re}(k)) \quad \text{Equation 7}$$

$$D_{im} = \text{sum}(d_{im}(k)) \quad \text{Equation 8}$$

In various embodiments, the packet type detector 31 then determines the packet type of the data unit based on the total distances $D_{re}$ and $D_{im}$ determined according to Equations 7-8. For example, in an embodiment, the packet type detector 31 performs a comparison between the total real distance $D_{re}$ and the total imaginary distance $D_{im}$. In this embodiment, the packet type detector 31 determines, for example, that the data unit corresponds to the first packet type (for which the OFDM symbol is modulated according to Q-BPSK) if the real total distance $D_{re}$ is greater than the imaginary total distance $D_{im}$, and determines that the data unit corresponds to the second packet type (for which the OFDM symbol is modulated according to BPSK) if the imaginary total distance $D_{im}$ is greater than the real total distance $D_{re}$.

In another embodiment, the packet type detector 31 determines that the data unit corresponds to the first packet type if the real total distance $D_{re}$ is greater than the imaginary total distance $D_{im}$ by a predetermined threshold α, and determines that the data unit corresponds to the second packet type if the imaginary total distance $D_{im}$ is greater than the real total distance $D_{re}$ by the predetermined threshold α. For example, the packet type detector 31 divides the smaller one of the real total distance $D_{re}$ and the imaginary total distance $D_{im}$ by the greater one of the one of the real total distance $D_{re}$ and the imaginary total distance $D_{im}$, and determines the packet type of the data unit based on the resulting value (i.e., based on the value of $D_{re}/D_{im}$ or $D_{im}/D_{re}$). If the resulting value is greater than the predetermined threshold α, the packet type detector 21 determines that the data unit corresponds to the first packet type. On the other hand, if the resulting value is less than the predetermined threshold α, the packet type detector 31 determines that the data unit corresponds to the second packet type. Alternatively, in another embodiment, if the resulting value is less than the predetermined threshold α, the packet type detector 31 declares that the data unit was detected in error. In at least some such embodiments, the PHY processing unit 29 aborts further processing of the data unit.

As yet another example, in another embodiment, the packet type detector 31 first determines respective scaling factors for the real total distance $D_{re}$ and for the imaginary total distance $D_{im}$ based on an estimate of the channel response between the transmitting device and the receiving device. In some embodiments, the estimate of the channel response includes an estimated noise variance across OFDM tones of the OFDM symbol. In such embodiments, a variance of noise across OFDM tones is estimated or statistically determined and is included in the channel response estimate of the communication channel. Thus, in such embodiments, the respective scaling factors are based, at least in part, on the determined noise variance across OFDM tones. The packet type detector 31 then scales each total distance $D_{re}$ and $D_{im}$ by the corresponding scaling factor, determines the packet type of the data unit based on a comparison of the scaled total distances $D_{re}$ and $D_{im}$, in this embodiment.

Figure 5:
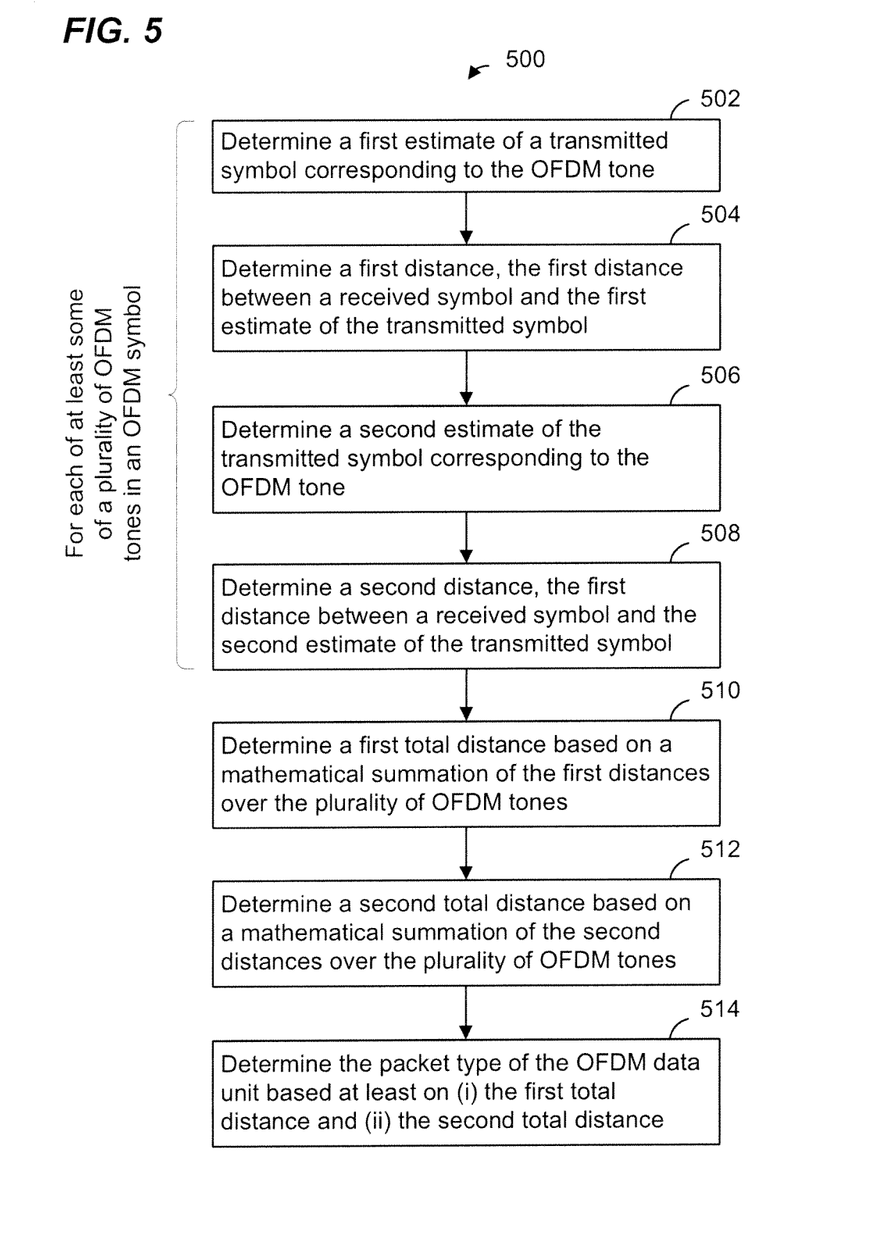
FIG. 5 is a flow diagram of an example method 500 for detecting a packet type of a data unit, according to an embodiment.

FIG. 5 is a flow diagram of an example method 500 for detecting a packet type of an OFDM data unit, according to an embodiment. With reference to FIG. 1, the method 500 is implemented by the network interface 16, in an embodiment. For example, in one such embodiment, the PHY processing unit 20 is configured to implement the method 500. According to an embodiment, the packet type detector 22 is configured to implement at least a part of the method 500. With continued reference to FIG. 1, in yet another embodiment, the method 500 is implemented by the network interface 27 (e.g., the PHY processing unit 29). According to an embodiment, the packet type detector 31 is configured to implement at least a part of the method 500. In other embodiments, the method 500 is implemented by other suitable network interfaces and/or by other suitable communication devices.

The method 500 generally determines a packet type of a data unit based on a modulation of an OFDM symbol of the data unit. As illustrated in FIG. 5, blocks 502-508 are performed for each of at least some of a plurality of OFDM tones in the OFDM symbol. At block 502, a first estimate of a transmitted symbol corresponding to the OFDM tone is determined. In an embodiment, the first estimate of the transmitted symbol corresponds to an estimate of a real part of the transmitted symbol. For example, in an embodiment, the first estimate is determined according to Equation 3. At block 504, a first distance is determined. The first distance is the distance between a received symbol and the determined first estimate of the transmitted symbol. For example, the first distance is determined at block 504 according to Equation 5, in an embodiment.

At block 506, a second estimate of the transmitted symbol corresponding to the OFDM tone is determined. In an embodiment, the second estimate of the transmitted symbol corresponds to an estimate of an imaginary part of the transmitted symbol. For example, in an embodiment, the second estimate is determined according to Equation 4. At block 508, a second distance is determined. The second distance is the distance between a received symbol and the determined second estimate of the transmitted symbol. For example, the second distance is determined at block 508 according to Equation 6, in an embodiment.

At block 510, a first total distance is determined based on a mathematical sum of the first distances determined at block 504. For example, a real total distance is determined at block 510 according to Equation 7, in an embodiment. At block 512, a second total distance is determined based on a mathematical sum of the second distances determined at block 508. For example, an imaginary total distance is determined at block 512 according to Equation 8, in an embodiment.

At block 514, the packet type of the data unit is determined based at least on the first total distance determined at block 510 and the second total distance determined at block 512. As an example, the total distance determined at block 510 is compared to the total distance determined at block 512, in an embodiment, and it is determined that the data unit corresponds to a first packet type, if the first total distance is greater than the second total distance. On the other hand, if the second total distance is greater than the first total distance, it is determined that the data unit corresponds to a second packet type.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method for detecting a packet type of an orthogonal frequency division multiplexing (OFDM) data unit received via a communication channel, the method comprising:
   for each of at least some of a plurality of OFDM tones in an OFDM symbol of the data unit
      determining a first estimate of a transmitted symbol corresponding to the OFDM tone,
      determining a first distance, the first distance being between a received symbol and the first estimate scaled by a channel response estimate corresponding to the OFDM tone,
      determining a second estimate of the transmitted symbol corresponding to the OFDM tone, the second estimate different being than the first estimate, and
      determining a second distance, the second distance being between the received symbol and the second estimate scaled by the channel response estimate corresponding to the OFDM tone;
   determining a first total distance based on a mathematical summation of the first distances over the plurality of OFDM tones;
   determining a second total distance based on a mathematical summation of the second distances over the plurality of OFDM tones; and
   determining the packet type of the OFDM data unit based at least on (i) the first total distance and (ii) the second total distance.

2. A method according to claim 1, wherein:
   determining the first estimate of the transmitted symbol comprises determining an estimate of a real part of the transmitted symbol; and
   determining the second estimate of the transmitted symbol comprises determining an estimate of an imaginary part of the transmitted symbol.

3. A method according to claim 1, wherein determining the packet type of the OFDM data unit comprises:
- determining that the data unit corresponds to a first packet type when the first total distance is greater than the second total distance; and
- determining that the data unit corresponds to a second packet type when the second total distance is greater than the first total distance.

4. A method according to claim 1, wherein determining the packet type of the OFDM data unit includes:
- determining that the data unit corresponds to a first packet type when the first total distance is greater than the second total distance by a predetermined threshold amount;
- determining that the data unit corresponds to a second packet type when the second total distance is greater than the first total distance by the predetermined threshold amount; and
- determining that the data unit was detected in error when (i) the first total distance is not greater than the second total distance by the predetermined threshold amount and (ii) the second total distance is not greater than the first total distance by the predetermined threshold amount.

5. A method according to claim 4, further comprising aborting further processing of the data unit when it is determined that the data unit was detected in error.

6. A method according to claim 1, wherein determining the packet type of the OFDM data unit comprises:
- scaling the first total distance by a first scaling factor to determine a first scaled distance;
- scaling the second total distance by a second scaling factor to determine a second scaled total distance;
- determining that the data unit corresponds to a first packet type when the first scaled total distance is greater than the second scaled total distance; and
- determining that the data unit corresponds to a second packet type when the second scaled total distance is greater than the first scaled total distances,
- wherein the first scaling factor and the second scaling factor is determined based on an estimated channel response of the communication channel.

7. A method according to claim 5, wherein the estimated channel response includes an estimated variance across OFDM tones of the OFDM symbol.

8. A method according to claim 1, wherein determining the packet type of the OFDM data unit comprises determining whether the data unit corresponds to (i) a normal mode data unit or (ii) a low bandwidth mode data unit.

9. A method according to claim 1, wherein determining the packet type of the OFDM data unit comprises determining whether the data unit corresponds to (i) a legacy data unit or (ii) a non-legacy data unit.

10. A method according to claim 1, wherein:
- the first estimate corresponds to the transmitted symbol modulated according to binary phase shift keying (BPSK) modulation; and
- the second estimate corresponds to the transmitted symbol modulated according to quadrature binary phase shift keying (Q-BPSK) modulation.

11. An apparatus for detecting a packet type of an orthogonal frequency division multiplexing (OFDM) data unit received via a communication channel, the apparatus comprising:
- a packet type detector configured to
  - for each of at least some of a plurality of OFDM tones in an OFDM symbol of the data unit
    - determine a first estimate of a transmitted symbol corresponding to the OFDM tone,
    - determine a first distance, the first distance being between a received symbol and the first estimate scaled by a channel response estimate corresponding to the OFDM tone,
    - determine a second estimate of the transmitted symbol corresponding to the OFDM tone, the second estimate being different than the first estimate, and
    - determine a second distance, the second distance between the received symbol and the second estimate scaled by the channel response estimate corresponding to the OFDM tone;
  - determine a first total distance based on a mathematical summation of the first distances over the plurality of OFDM tones;
  - determine a second total distance based on a mathematical summation of the second distances over the plurality of OFDM tones; and
  - determine the packet type of the OFDM data unit based at least on (i) the first total distance and (ii) the second total distance.

12. An apparatus according to claim 11, wherein the packet type detector is configured to:
- determine the first estimate of the transmitted symbol at least by determining an estimate of a real part of the transmitted symbol; and
- determine the second estimate of the transmitted symbol at least by determining an estimate of an imaginary part of the transmitted symbol.

13. An apparatus according to claim 11, wherein the packet type detector is configured to, when determining the packet type of the OFDM data unit:
- determine that the data unit corresponds to a first packet type when the first total distance is greater than the second total distance; and
- determine that the data unit corresponds to a second packet type when the second total distance is greater than the first total distance.

14. An apparatus according to claim 1, wherein the packet type detector is configured to, when determining the packet type of the OFDM data unit:
- determine that the data unit corresponds to a first packet type when the first total distance is greater than the second total distance by a predetermined threshold amount;
- determine that the data unit corresponds to a second packet type when the second total distance is greater than the first total distance by the predetermined threshold amount; and
- determine that the data unit was detected in error when (i) the first total distance is not greater than the second total distance by the predetermined threshold amount and (ii) the second total distance is not greater than the first total distance by the predetermined threshold amount.

15. An apparatus according to claim 14, wherein further processing of the data unit is aborted when it is determined that the data unit was detected in error.

16. An apparatus according to claim 11, wherein the packet type detector is configured to when determining the packet type of the OFDM data unit:
- scale the first total distance by a first scaling factor to determine a first scaled distance;
- scale the second total distance by a second scaling factor to determine a second scaled total distance, and determine that the data unit corresponds to a first packet type when the first scaled total distance is greater than the second scaled total distance, and determine that the data unit corresponds to a second packet type when the second scaled total distance is greater than the first scaled total distances;

wherein the first scaling factor and the second scaling factor is determined based on an estimated channel response of the communication channel.

17. An apparatus according to claim 11, wherein the estimated channel response includes an estimated variance across OFDM tones of the OFDM symbol.

18. An apparatus according to claim 11, wherein the packet detector is configured to determine the packet type of the OFDM data unit at least by determining whether the data unit corresponds to (i) a normal mode data unit or (ii) a low bandwidth data mode unit.

19. An apparatus according to claim 11, wherein the packet detector is configured to determine the packet type of the OFDM data unit at least by determining the packet type of the OFDM data unit comprises determining whether the data unit corresponds to (i) a legacy data unit or (ii) a non-legacy data unit.

20. An apparatus according to claim 11, wherein:

the first estimate corresponds to the transmitted symbol modulated according to binary phase shift keying (BPSK) modulation; and the second estimate corresponds to the transmitted symbol modulated according to quadrature binary phase shift keying (Q-BPSK) modulation.

\* \* \* \* \*